(12) United States Patent
Han et al.

(10) Patent No.: US 9,949,606 B2
(45) Date of Patent: *Apr. 24, 2018

(54) DUST COLLECTING APPARATUS AND VACUUM CLEANER HAVING THE SAME

(71) Applicant: SAMSUNG ELECTRONICS CO., LTD., Suwon-si, Gyeonggi-do (KR)

(72) Inventors: Jung Gyun Han, Gwangju (KR); Jun Hoo Choe, Gwangju (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 183 days.

This patent is subject to a terminal disclaimer.

(21) Appl. No.: 14/729,563

(22) Filed: Jun. 3, 2015

(65) Prior Publication Data

US 2015/0265120 A1    Sep. 24, 2015

Related U.S. Application Data

(63) Continuation of application No. 14/301,662, filed on Jun. 11, 2014, now Pat. No. 9,078,548.

(30) Foreign Application Priority Data

Jun. 11, 2013 (KR) .................... 10-2013-0066360

(51) Int. Cl.
| | |
|---|---|
| *A47L 9/10* | (2006.01) |
| *A47L 9/16* | (2006.01) |
| *A47L 9/14* | (2006.01) |
| *B01D 46/48* | (2006.01) |

(52) U.S. Cl.
CPC ........... *A47L 9/1683* (2013.01); *A47L 9/1445* (2013.01); *A47L 9/1472* (2013.01); *B01D 46/48* (2013.01)

(58) Field of Classification Search
CPC .... A47L 9/1683; A47L 9/1445; A47L 9/1472; A47L 9/10; B01D 46/48
USPC .......................................................... 15/347
See application file for complete search history.

(56) References Cited

U.S. PATENT DOCUMENTS 9,078,548 B2 *   7/2015   Han ................. A47L 9/1683

FOREIGN PATENT DOCUMENTS

| DE | 197 55 176 A1 | 2/1999 |
| DE | 10 2004 040 981 A1 | 3/2006 |
| EP | 0 839 494 A2 | 5/1998 |

OTHER PUBLICATIONS

European Search Report dated Nov. 10, 2014 issued in European Patent Application 14170321.5.

(Continued)

*Primary Examiner* — David Redding
(74) *Attorney, Agent, or Firm* — Staas & Halsey LLP

(57) ABSTRACT

A dust collecting apparatus in which, when a filter cover is attempted to be closed in a state in which the filter is not installed, the filter cover is prevented from closing by a simple configuration, and a vacuum cleaner having the same. The dust collecting apparatus includes a filter, a cover including a filter installation part in which the filter is installed and a catching rib which is provided at the filter installation part, and a filter cover which covers an upper portion of the cover, and the filter cover includes a closing prevention rib which is restricted by the catching rib so as to prevent the filter cover from closing when the filter is not installed.

19 Claims, 11 Drawing Sheets

(56) References Cited

OTHER PUBLICATIONS

U.S. Notice of Allowance dated Mar. 4, 2015 in related U.S. Appl. No. 14/301,662.
U.S. Corrected Notice of Allowance dated May 5, 2015 in related U.S. Appl. No. 14/301,662.
U.S. Appl. No. 14/301,662, filed Jun. 11, 2014, Jung Gyun Han, Samsung Electronics Co., Ltd.
European Decision on Grant dated Nov. 25, 2015 in corresponding European Patent Application 14170321.5.

* cited by examiner

DUST COLLECTING APPARATUS AND VACUUM CLEANER HAVING THE SAME

CROSS-REFERENCE TO RELATED APPLICATIONS

This application is a continuation of U.S. application Ser. No. 14/301,662, filed Jun. 11, 2014, which claims the benefit of Korean Patent Application No. 10-2013-0066360, filed on Jun. 11, 2013 in the Korean Intellectual Property Office, the disclosure of which is incorporated herein by reference.

BACKGROUND

1. Field

The following description relates to a dust collecting apparatus and a vacuum cleaner having the same.

2. Description of the Related Art

In general, a vacuum cleaner is a device to suction air containing foreign objects such as dust from a surface to be cleaned, to separate and to collect the foreign objects such as dust and discharging cleaned air to an outside of a body thereof.

Particularly, a cyclone type vacuum cleaner which separates the foreign objects from the sucked air using centrifugal force may be used semi-permanently, and also may be used in a more sanitary and convenient way than in a conventional vacuum cleaner using a dust bag or a dust filter, and is used widely.

A vacuum cleaner includes a body which receives a fan motor generating suction force, a suction unit which sucks air from a surface to be cleaned, a connection unit which connects the suction unit and the body, and a dust collecting apparatus which receives the air sucked by the suction unit and separates and collects foreign objects such as dust.

The dust collecting apparatus includes a dust separating chamber in which the foreign objects such as dust is primarily separated from the sucked air using the centrifugal force, and a filter which re-collects fine dust remaining in the air.

The filter is disposed at an upper side of the dust separating chamber so that the air passing through the dust separating chamber is discharged from the dust collecting apparatus through the filter, and a filter cover is rotatably hinged to an upper portion of the filter in order to prevent exposure of the filter.

After using the vacuum cleaner for a long period of time, the filter cover is opened to replace the filter, the filter is removed and replaced with a new one, and then the vacuum cleaner may be used.

However, a user may negligently open the filter cover to replace the filter, remove the filter, close the filter cover, and operate the vacuum cleaner in a state in which no new filter is installed.

If the vacuum cleaner is operated without the filter, the air in which the fine dust is not removed is transferred to the body, and the fine dust may be introduced into the fan motor disposed in the body, and thus problems may occur in the fan motor.

In order to prevent such problems, it may be necessary to prevent the filter cover from closing when a user attempts to close the filter cover in the state in which no filter is installed, so that the user recognizes the fact that no filter is installed.

SUMMARY

Therefore, it is an aspect of the present disclosure to provide a dust collecting apparatus in which a filter cover is prevented from closing by a simple configuration when the filter cover is attempted to be closed in a state in which no filter is installed, and a vacuum cleaner having the same.

Additional aspects of the disclosure will be set forth in part in the description which follows and, in part, will be apparent from the description, or may be learned by practice of the disclosure.

In accordance with an aspect of the present disclosure, a dust collecting apparatus includes a housing including an inlet part through which air is sucked and a dust separating chamber which separates dust from the air sucked through the inlet part, a filter disposed at an upper portion of the housing so as to filter fine dust contained in the air passing through the dust separating chamber, a cover configured to cover the upper portion of the housing and including a filter installation part in which the filter is installed and a catching rib which is provided at the filter installation part, a filter cover which is rotatably hinged to an upper portion of the cover so as to prevent the filter from being exposed, and a closing prevention rib which is rotatably hinged to the filter cover and rotates to close the filter cover. When the filter is installed and the closing prevention rib contacts with an upper surface of the filter while closing the filter case, the closing prevention rib slides along the upper surface of the filter so that the filter case closes, and when the filter is not installed and the closing prevention rib contacts with an upper surface of the filter installation part while closing the filter case, the closing prevention rib slides along the upper surface of the filter installation part and is restricted by the catching rib to prevent the filter cover from closing.

The housing may be provided to have a hollow cylindrical shape, and a base is provided at a lower portion of the housing so as to cover the lower portion of the housing.

An inlet port that allows the air to be sucked into the inlet part may be provided at the base in communication with the inlet part.

The dust separating chamber may have a hollow cylindrical shape and may be provided in the housing in communication with the inlet part.

A guide part having a cylindrical shape may be provided in the dust separating chamber so as to guide the air sucked through the inlet part and thus to form a rotating air current, and a spiral part having a spiral shape may be provided around the guide part.

An outlet part may be provided at the housing so as to discharge the air, in which the dust is removed in the dust separating chamber, to an outside of the housing, and a grill may be provided at the outlet part so as to remove the dust again from the air in which the dust is removed in the dust separating chamber.

A dust collecting chamber may be provided at a space between the housing and the dust separating chamber so as to collect the dust separated in the dust separating chamber, and the dust separating chamber and the dust collecting chamber may be in communication with each other via an opening.

The cover may include a hinge coupling part to which a filter cover is hinged, and a coupling part which is coupled to the outlet part to be in communication with the outlet part.

The filter cover may include a hinge shaft which is rotatably coupled to the hinge coupling part, a rotational shaft coupling part to which the closing prevention part is hinged, and an outlet port which discharges the air in which the dust is removed by the dust separating chamber and the filter.

The closing prevention rib may include a rotational shaft which is rotatably hinged to the rotational shaft coupling part, a contact part which is in contact with the upper surface of the filter or with the upper surface of the filter installation part, and a connection part which connects the rotational shaft and the contact part.

The contact part may have a cylindrical shape so as to be in contact with the upper surface of the filter and then to be slid, and may also be provided to be thicker than the rotational shaft so that the closing prevention rib is rotated about the rotational shaft by the force of gravity.

The contact part may have a cylindrical shape so as to be in contact with the upper surface of the filter and then to be slid, and an elastic member may be coupled to the rotational shaft so that the closing prevention rib is rotated when the contact part is in contact with the upper surface of the filter.

In accordance with another aspect of the present disclosure, a dust collecting apparatus includes a housing comprising an inlet part through which air is sucked and a dust separating chamber which separates dust from the air sucked through the inlet part, a filter disposed at an upper portion of the housing so as to filter fine dust contained in the air passing through the dust separating chamber, a cover configured to cover the upper portion of the housing and comprising a filter installation part in which the filter is installed, a filter cover which is rotatably hinged to an upper portion of the cover so as to prevent the filter from being exposed, and a closing prevention rib which is rotatably provided at the filter cover and rotates to close the filter cover. When the filter is installed and the closing prevention rib contacts with an upper surface of the filter while closing the filter case, the closing prevention rib slides along the upper surface of the filter so that the filter case closes, and when the filter is not installed and the closing prevention rib contacts with an upper surface of the filter installation part while closing the filter case, the closing prevention rib slides along the upper surface of the filter installation part and is restricted by the catching rib to prevent the filter cover from closing.

In accordance with yet another aspect of the present disclosure, a vacuum cleaner includes a body, a suction unit which sucks air from a surface to be cleaned using a suction force generated from the body, and a dust collecting apparatus which is provided at the body so as to receive air sucked by the suction unit and then to separate dust, wherein the dust collecting apparatus includes a housing comprising a dust separating chamber which receives the air sucked by the suction unit and separates the dust, a filter disposed at an upper portion of the housing so as to filter fine dust contained in the air passing through the dust separating chamber, a cover configured to cover the upper portion of the housing and comprising a filter installation part which is provided at an upper portion thereof for installation of the filter and a catching rib which is provided at the filter installation part, a filter cover which is rotatably hinged to the upper portion of the cover so as to prevent the filter from being exposed, and a closing prevention rib which is rotatably hinged to the filter cover so as to be in contact with an upper surface of the filter and to be slid and rotated so that the filter cover closes when the filter cover is attempted to be closed in a state in which the filter is installed, and also to be caught by the catching rib and thus to prevent the filter cover from closing when the filter cover is attempted to be closed in a state in which the filter is removed.

The suction unit and the dust collecting apparatus may be connected with each other through a connection unit, and the dust collecting apparatus may include an inlet port through which the air transferred through the connection unit is introduced and an outlet port through which the air introduced into the inlet port and purified by removing the dust is discharged.

The body may include an installation part in which the dust collecting apparatus is installed, a first communication part via which the inlet port and the connection unit are in communication with each other, and a second communication part in communication with the outlet port.

The closing prevention rib may include a rotational shaft which is rotatably coupled to the filter cover, a contact part which is in contact with the upper surface of the filter or the upper surface of the filter installation part, and a connection part which connects the rotational shaft and the contact part.

The contact part may have a cylindrical shape so as to be in contact with the upper surface of the filter or with the upper surface of the filter installation part, and may also be provided to be thicker than the rotational shaft so that the closing prevention rib is rotated about the rotational shaft by the force of gravity.

The contact part may have a cylindrical shape so as to be in contact with the upper surface of the filter or the upper surface of the filter installation part, and an elastic member may be coupled to the rotational shaft so that the closing prevention rib is rotated when the contact part is in contact with the upper surface of the filter or the upper surface of the filter installation part.

BRIEF DESCRIPTION OF THE DRAWINGS

These and/or other aspects of the disclosure will become apparent and more readily appreciated from the following description of embodiments, taken in conjunction with the accompanying drawings of which.

DETAILED DESCRIPTION

Reference will now be made in detail to embodiments of the present disclosure, examples of which are illustrated in the accompanying drawings.

Figure 1:
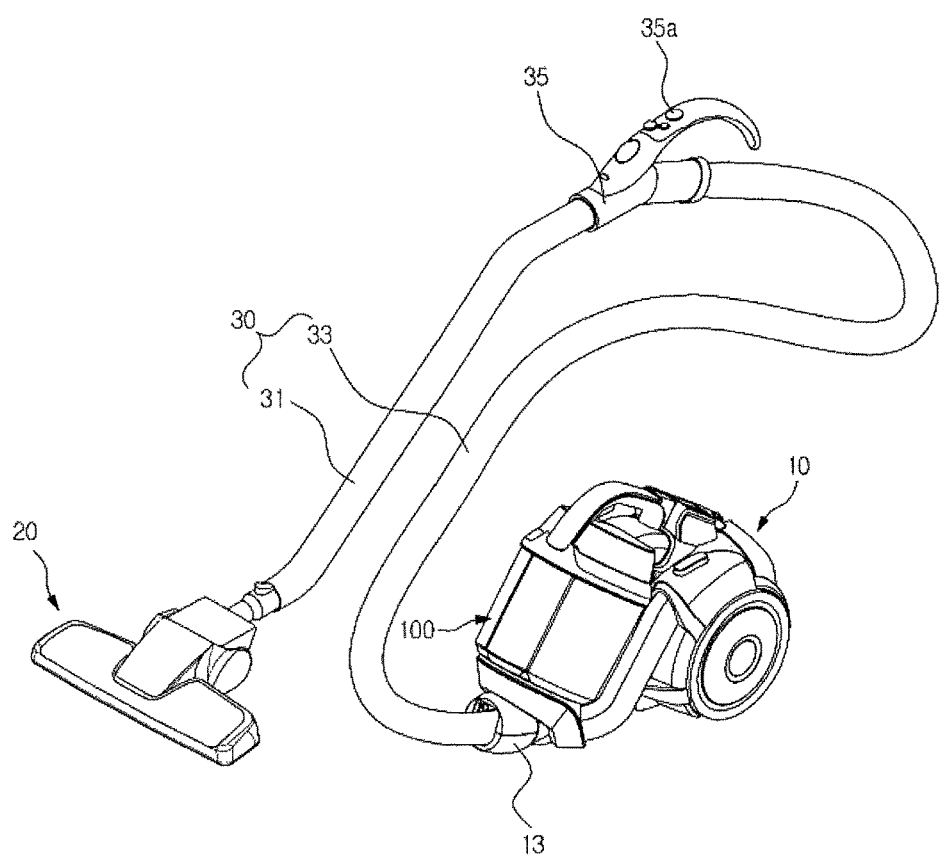
FIG. 1 is a perspective view of a vacuum cleaner in accordance with an embodiment of the present disclosure.
Figure 2:
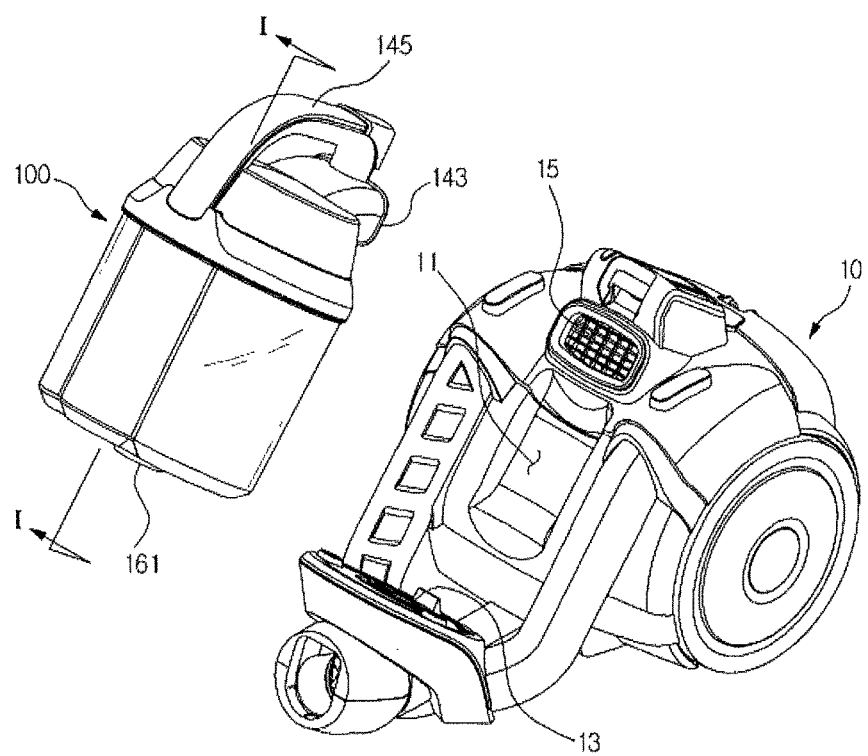
FIG. 2 is an exploded perspective view of a body in which a dust collecting apparatus is installed in accordance with an embodiment of the present disclosure.

As illustrated in FIGS. 1 and 2, a vacuum cleaner includes a body 10 in which a fan motor (not shown) generating suction force is disposed, a suction unit 20 which sucks air from a surface to be cleaned, a connection unit 30 which connects the suction unit 20 and the body 10, and a dust collecting apparatus 100 which is coupled to the body 10 so as to receive the air sucked by the suction unit 20 and to separate and collect foreign objects such as dust.

The body 10 includes an installation part 11 in which the dust collecting apparatus 100 is installed, a first communication part 13 via which an inlet port 161 of the dust collecting apparatus 100 and a connection hose 33 of the connection unit 30 are in communication with each other, and a second communication part 15 in communication with an outlet port 143 of the dust collecting apparatus 100.

The suction unit 20 serves to be in close contact with a surface to be cleaned and then to suck air from the surface to be cleaned, and the air sucked by the suction unit 20 is transferred to the dust collecting apparatus 100 coupled to the body 10 through the connection unit 30.

The connection unit 30 connects the suction unit 20 and the body 10, and transfers the air sucked by the suction unit 20 to the dust collecting apparatus 100 coupled to the body 10, and includes a connection tube 31 connected to the suction unit 20 and a connection hose 33 connecting the connection tube 31 and the body 10.

The connection tube 31 is provided to have a predetermined strength, and connected to the suction unit 20 so that the air sucked by the suction unit 20 is transferred to dust collecting apparatus 100 coupled to the body 10.

The connection hose 33 connects the connection tube 31 and the body 10, and is formed of a flexible material, for example.

A handle 35 which is grasped by a user is provided between the connection tube 31 and the connection hose 33. The handle 35 includes a plurality of operation buttons 35a which enable the user to operate the vacuum cleaner.

The dust collecting apparatus 100 serves to separate the foreign objects such as dust from the air sucked through the suction unit 20 and thus to purify the air. In the drawings, the dust collecting apparatus 100 is formed as a cyclone type in which a rotating air current is generated so that the foreign objects such as dust is separated from the air by centrifugal force. However, the dust collecting apparatus 100 may be formed as a dust bag type in which the foreign objects are filtered by passing the air through a filter bag, or may be formed as one of various well-known types which may separate the foreign objects from the air.

The purified air in which the foreign objects are separated by the dust collecting apparatus 100 is transferred to the body 10 through the outlet port 143 and then discharged to an outside of the body 10.

Figure 3:
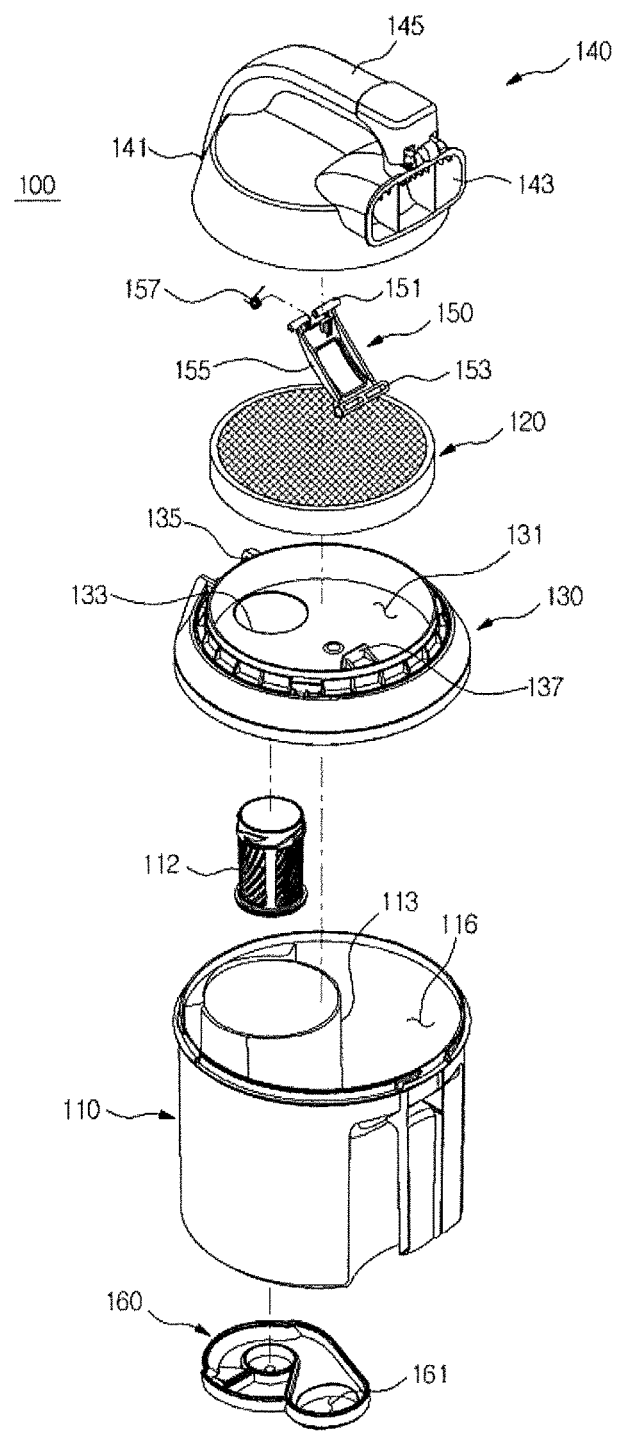
FIG. 3 is an exploded perspective view of the dust collecting apparatus in accordance with an embodiment of the present disclosure.
Figure 4:
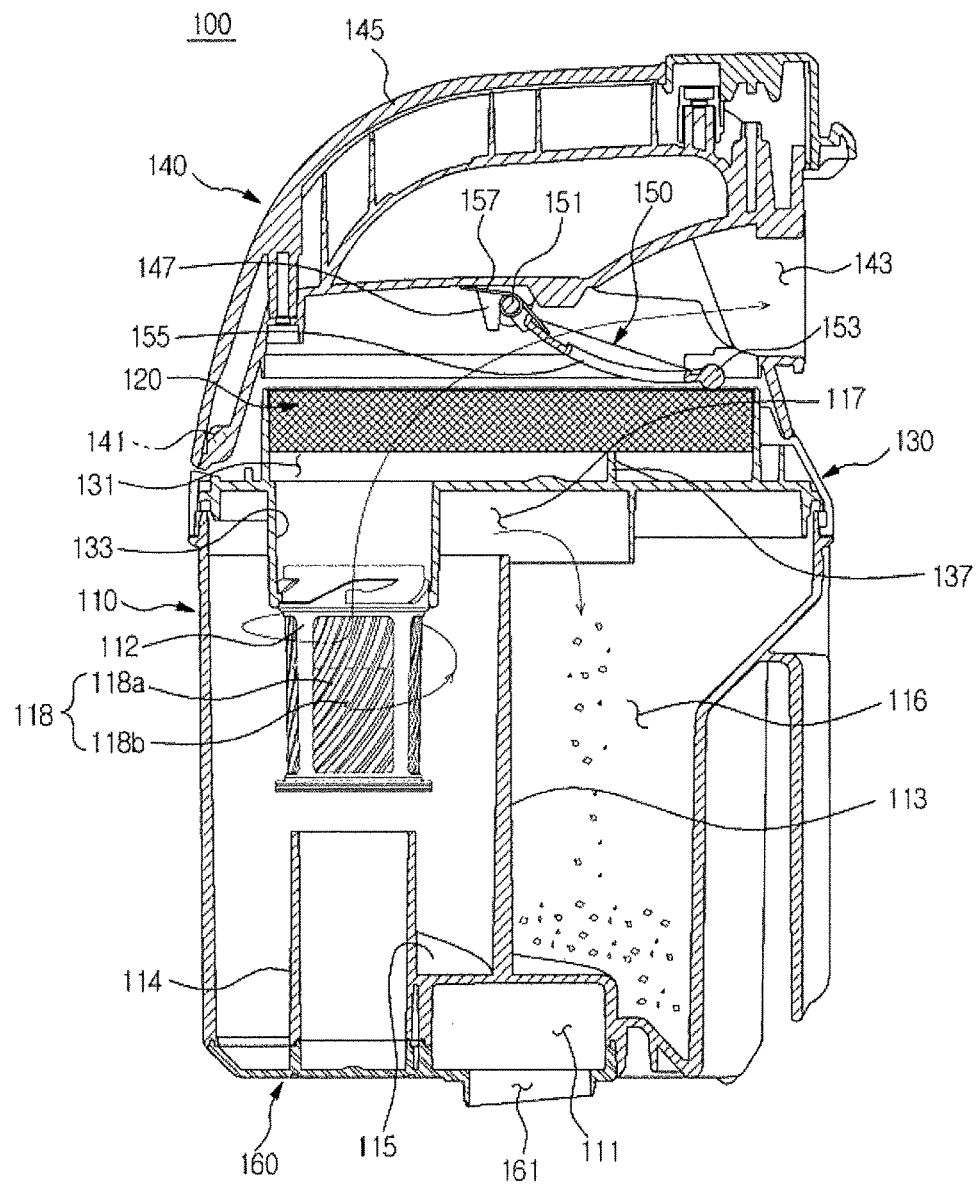
FIG. 4 is a cross-sectional view of the dust collecting apparatus in accordance with an embodiment of the present disclosure.

As illustrated FIGS. 2 to 4, the dust collecting apparatus 100 is installed in the installation part 11 of the body 10, and includes a housing 110 which forms an external appearance and has a dust separating chamber 113 therein to separate dust from the air sucked through the suction unit 20, a filter 120 disposed at an upper portion of the housing 110 so as to collect fine dust in the air from which the dust is separated in the dust separating chamber 113, a cover 130 which covers the upper portion of the housing 110 and in which the filter 120 is installed, a filter cover 140 which is coupled to the cover 130 so as to prevent exposure of the filter 120, a closing prevention rib 150 which is coupled to the filter cover 140 so as to prevent the filter cover 140 from closing when the filter cover 140 is attempted to be closed in a state in which the filter 120 is not installed at the cover 130, and a base 160 which covers a lower portion of the housing 110.

The housing 110 has a hollow cylindrical shape. An inlet part 111 in communication with the first communication part 13 of the body 10 is provided at the lower portion of the housing 110, and an outlet part 112 in communication with the second communication part 15 is provided at the upper portion.

Even though the housing 110 has the cylindrical shape on the drawings, the housing 110 may have various shapes other than the cylindrical shape.

The inlet part 111 is connected with the connection unit 30 by the first communication part 13 so that the air sucked from the suction unit 20 is transferred to the dust collecting apparatus 100 through the connection unit 30.

The outlet part 112 is disposed so as to be coupled with a coupling part 133 of the cover 130, which will be described below, and connected to the second communication part 15 so that the purified air in which the foreign objects are separated from the air introduced through the inlet part 111 is transferred to the body 10.

A dust separating chamber 113 that generates a rotating air current is provided in the housing 110 so as to separate the foreign objects such as dust from the air sucked through the inlet part 111.

The dust separating chamber 113 has a hollow cylindrical shape in order to generate the rotating air current. Further, the dust separating chamber 113 is provided to have a smaller diameter than the housing 110 and also to be connected with the inlet part 111 in the housing 110.

A guide part 114 guiding the rotating air current may be provided at an internal central portion of the dust separating chamber 113 so as to have a cylindrical shape, and a spiral part 115 may be provided around the guide part 114 so as to be spirally inclined.

Since the dust separating chamber 113 has the guide part 114 and the spiral part 115, the air introduced through the inlet part 111 may be rotated along the spiral part 115 around the guide part 114.

A dust collecting chamber 116 collecting the dust separated in the dust separating chamber 113 is provided in the housing 110. The dust collecting chamber 116 may be provided at a space other than the dust separating chamber 113 in the housing 110.

The dust separating chamber 113 and the dust collecting chamber 116 are in communication with each other via an opening 117. Since the foreign objects such as dust which is heavier than the air is separated from the air by the centrifugal force and then scattered to an outside of the dust separating chamber 113, the opening 117 is formed at the outside of the dust separating chamber 113.

The air in which the foreign objects such as dust is separated in the dust separating chamber 113 is discharged to an outside of the housing 110 through the outlet part 112, and the outlet part 112 may include a grill 118 that refilters the dust from the purified air in which the dust is removed or filtered in the dust separating chamber 113.

In the drawings, the grill 118 is formed at a circumferential surface of the outlet part 112. However, the grill 118 may be formed at a lower surface of the outlet part 112.

The grill 118 may include a grill body 118a, and an air passing hole 118b formed in the grill body 118a.

The air passing hole 118b may serve to prevent the dust having a predetermined size or more and passing from the outside of the outlet part 112 to an inside thereof from being discharged to the outside of the housing 110.

The dust which does not pass through the air passing hole 118b may be rotated again by the rotating air current in the dust separating chamber 113 and then collected in the dust collecting chamber 116.

The filter 120 is installed at a filter installation part 131 of the cover 130, which will be described below, and disposed at the upper portion of the housing 110 so as to collect the fine dust in the air in which the foreign objects such as dust is separated in the dust separating chamber 113.

The cover 130 serves to cover the opened upper portion of the housing 110, and includes the filter installation part 131 in which the filter 120 is removably installed, a coupling part 133 to which the outlet part 112 is coupled, and a hinge coupling part 135 to which the filter cover 140 is rotatably hinged.

The filter installation part 131 is depressed downward from an upper portion of the cover 130 so that the filter 120 may be installed therein. The coupling part 133 is provided toward a lower portion of the filter installation part 131 so as to have a hollow cylindrical shape, such that the air transferred through the outlet part 112 coupled to the coupling part 133 in the state in which the foreign objects such as dust are removed or filtered are transferred to the filter 120.

A catching rib 137 is provided at an upper surface of the filter installation part 131. When the filter 120 is installed at the filter installation part 131, the catching rib 137 is not exposed, but when the filter 120 is removed from the filter installation part 131, it is exposed.

The catching rib 137 is provided to protrude upward from the upper surface of the filter installation part 131. In the drawings, only one catching rib 137 is provided, but a plurality of catching ribs may be provided.

Since the catching rib 137 is operated together with the closing prevention rib 150 provided at the filter cover 140, a function of the catching rib 137 will be described later.

The base 160 covers the opened lower portion of the housing 110 and has the inlet port 161 which connects the first communication part 13 and the inlet part 111 so that the air sucked through the first communication part 13 of the body 10 connected with the connection unit 30 may be introduced into the inlet part 111.

The filter cover 140 is rotatably hinged to the upper portion of the cover 130 so as to prevent the filter 120 from being exposed to the outside. When the filter 120 is replaced, the filter cover 140 is opened, and then the filter 120 is replaced with a new one.

The filter cover 140 includes a hinge shaft 141 which is rotatably coupled to the hinge coupling part 135 of the cover 130, the outlet port 143 in communication with the second communication part 15 of the body 10 so as to transfer the air purified through the dust separating chamber 113 and the filter 120 to the body 10, and a handle 145 which is provided so as to open and close the filter cover 140.

The filter cover 140 is provided so that the hinge shaft 141 is rotatably coupled to the hinge coupling part 135 of the cover 130 and thus a user may grasp the handle 145 and then may open and close the filter cover 140.

Figure 5:
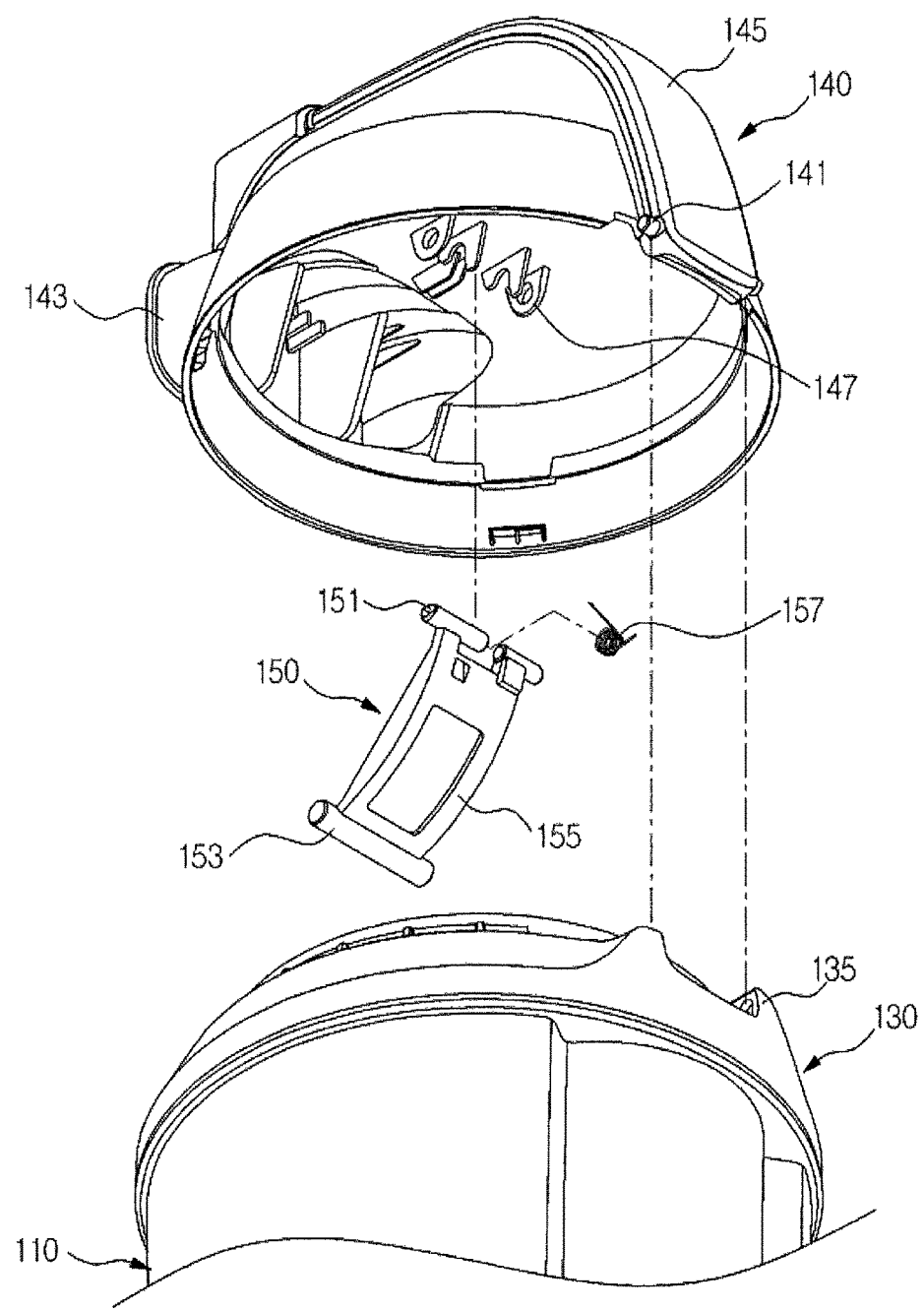
FIG. 5 is a view illustrating a closing prevention rib which is provided at a filter cover in accordance with an embodiment of the present disclosure.

As illustrated in FIGS. 3 to 5, the closing prevention rib 150 is provided at the filter cover 140 so as to prevent the filter cover 140 from closing while the filter 120 installed at the filter installation part 131 of the cover 130 is removed in order to be replaced with the new one.

The closing prevention rib 150 includes a rotational shaft 151 which is rotatably coupled to the filter cover 140, a contact part 153 which is in contact with an upper surface of the filter 120 when the filter cover 140 is closed, a connection part 155 which connects the rotational shaft 151 and the contact part 153, and an elastic member 157 which is provided at the rotational shaft 151 so as to fix the closing prevention rib 150 and thus to prevent rotation of the closing prevention rib 150, and also to allow the closing prevention rib 150 to be rotated when an external force is applied to the contact part 153.

The rotational shaft 151 is rotatably coupled to a rotational shaft coupling part 147 provided at the filter cover 140 so as to enable the closing prevention rib 150 to be rotated. The elastic member 157 is provided at the rotational shaft 151, such that, when the filter cover 140 is opened, the closing prevention rib 150 is rotated about the rotational shaft 151 by an elastic force of the elastic member 157, and when the filter cover 140 is closed, the contact part 153 is in contact with the upper surface of the filter 120, and the closing prevention rib 150 is rotated about the rotational shaft 151.

The contact part 153 may have, for example, a cylindrical shape so as to be in contact with the upper surface of the filter 120 and then slid.

The above case is a state in which the filter 120 is installed at the filter installation part 131 of the cover 130. However, if the filter cover 140 is closed while the filter 120 is removed from the filter installation part 131 in order to replace the filter 120, the vacuum cleaner is operated without the filter 120, and thus the fine dust which supposed to be removed or filtered from the air by the filter 120 is not removed or filtered and is transferred to the body 10. Therefore, the fine dust may be introduced into the fan motor generating a suction force in the body 10, and problems may occur in the fan motor.

As described above, the closing prevention rib 150 serves to prevent the filter cover 140 from closing when the filter cover 140 is attempted to be closed in the state in which the filter 120 is removed, such that the user may recognize the fact that the filter 120 is not installed at the filter installation part 131.

While the filter 120 is not installed at the filter installation part 131, the catching rib 137 provided at the filter installation part 131 is exposed to the outside. In this state, if the filter cover 140 is attempted to be closed, the contact part 153 of the closing prevention rib 150 is restricted by the catching rib 137. For example, the contact part 153 may be caught by the catching rib 137, and thus the filter cover 140 is prevented from closing. The catching rib 137 is provided at a location where the catching rib 137 may restrict the movement of the contact part 153 when the contact part 153 slides along the upper surface of the filter installation part 131 while the filter case 140 is closing. For example, when the contact part 153 contacts the upper surface of the filter installation part 131, the catching rib 137 may be located at a position in front of the contact part 153 in the sliding direction of the contact part 153.

Thus, the user may easily recognize the fact that the filter 120 is not installed.

Figure 6:
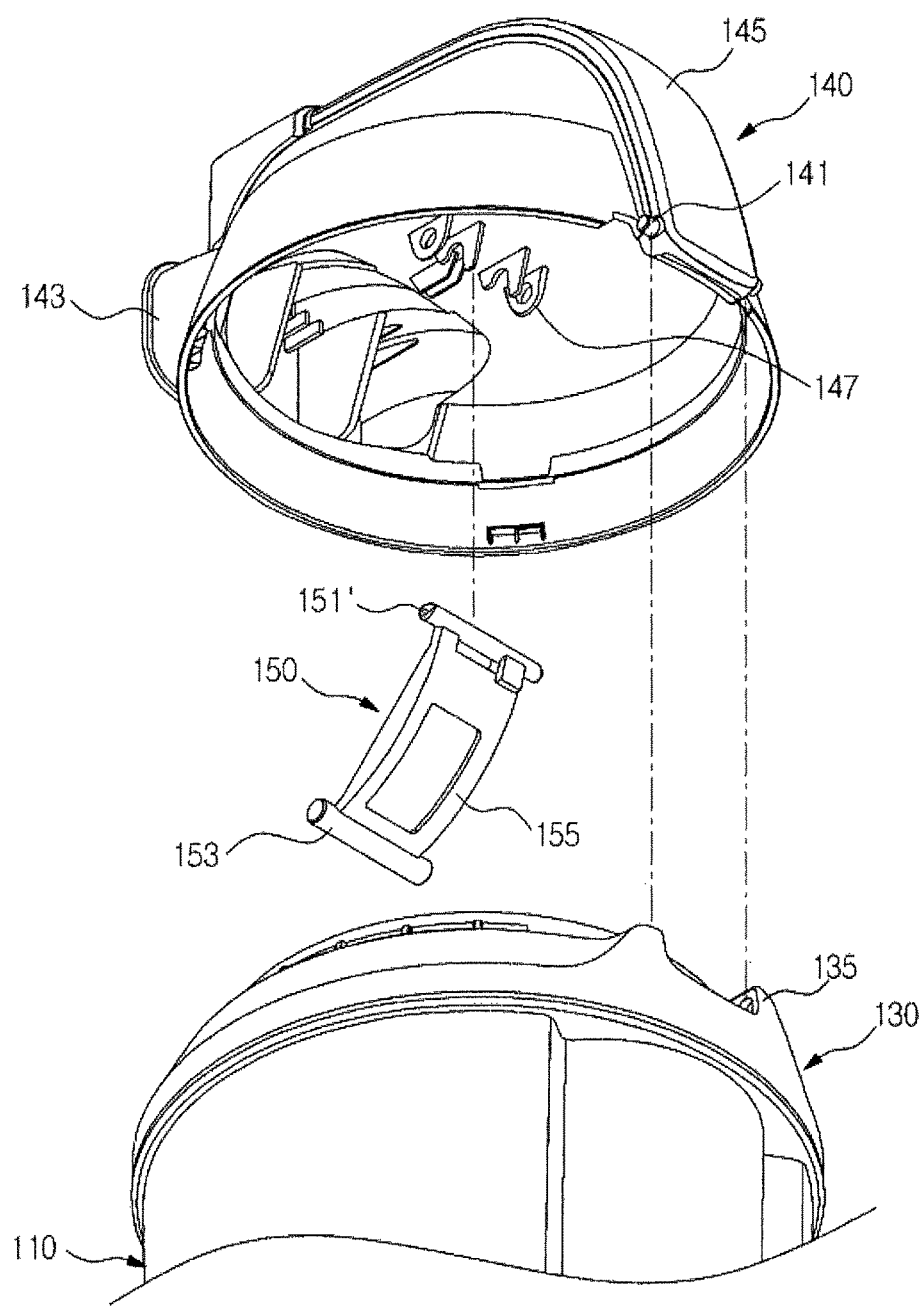
FIG. 6 is a view illustrating another embodiment of FIG. 5.

As illustrated in FIG. 6, a rotational shaft 151' of the closing prevention rib 150 may be configured not to have the elastic member.

In this case, the contact part 153 is formed to be thicker than the rotational shaft 151'. If the filter cover 140 is opened, the contact part 153 is rotated about the rotational shaft 151' so that the closing prevention rib 150 is rotated about the rotational shaft by the force of gravity.

With reference to FIGS. 7 to 11, an operation of the closing prevention rib 150 according to the opening and closing of the filter cover 140 will be described.

Figure 7:
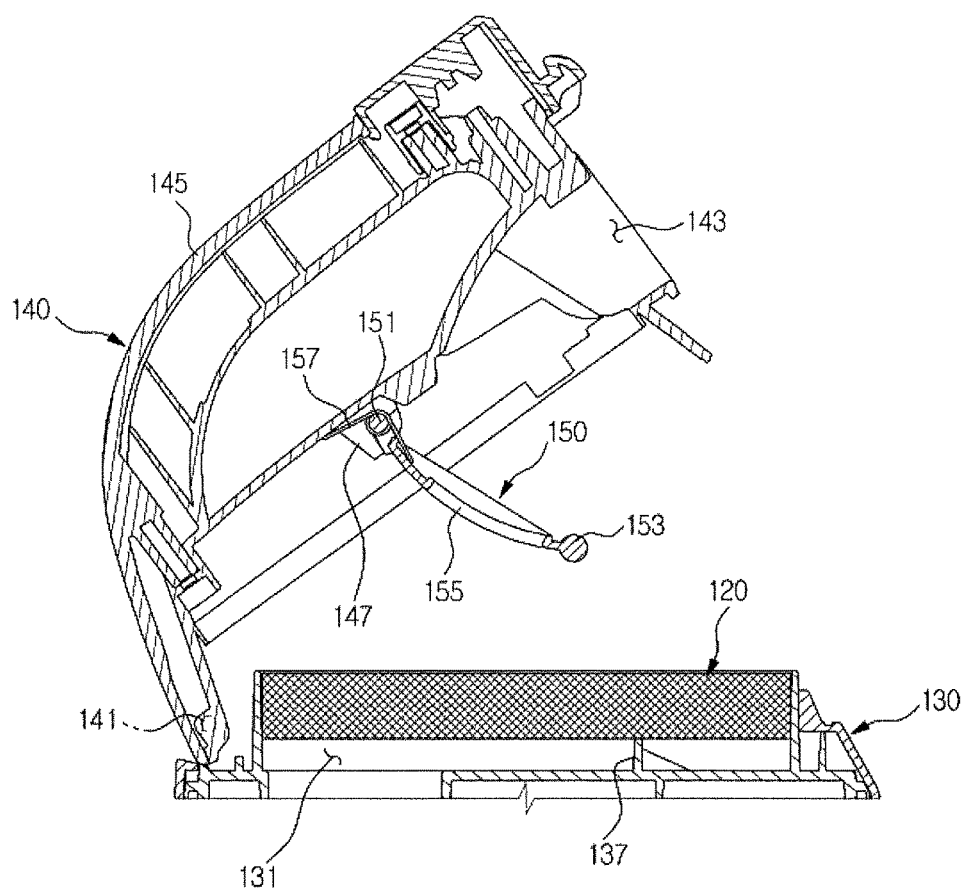
FIGS. 7, 8 and 9 are views illustrating a process of closing the filter cover in a state in which a filter is installed.

As illustrated in FIG. 7, if the filter cover 140 is opened in the state in which the filter 120 is installed at the filter installation part 131 of the cover 130, the closing prevention rib 150 is rotated about the rotational shaft 151 at a predetermined angle in a clockwise direction by the elastic force of the elastic member 157.

Figure 8:
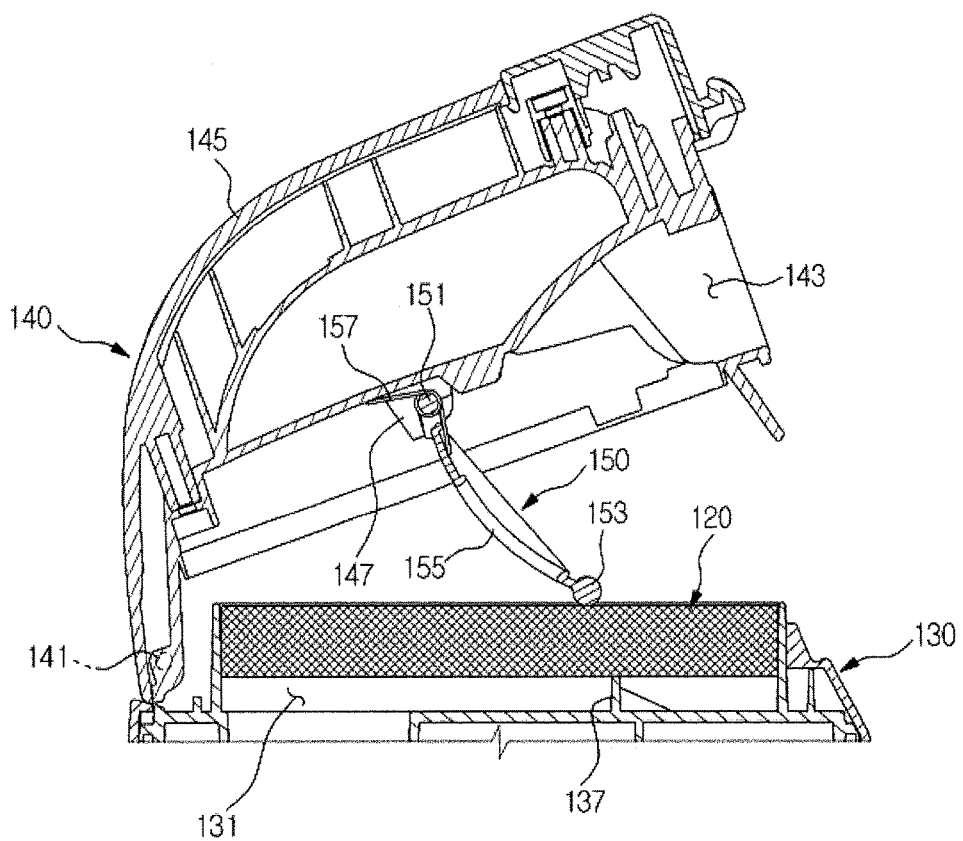
Figure 9:
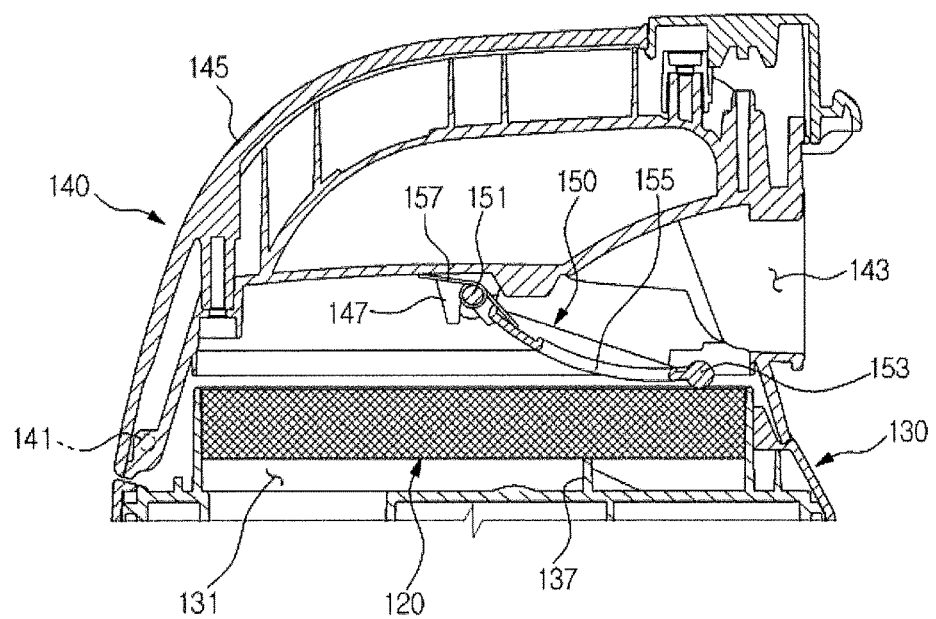

In this state, if the filter cover 140 is to be closed, the contact part 153 of the closing prevention rib 150 is in contact with the upper surface of the filter 120 as illustrated in FIG. 8, the contact part 153 is slid on the upper surface of the filter 120, and the closing prevention rib 150 is rotated about the rotational shaft 151 in a counterclockwise direction, and thus the filter cover 140 closes as illustrated in FIG. 9.

Figure 10:
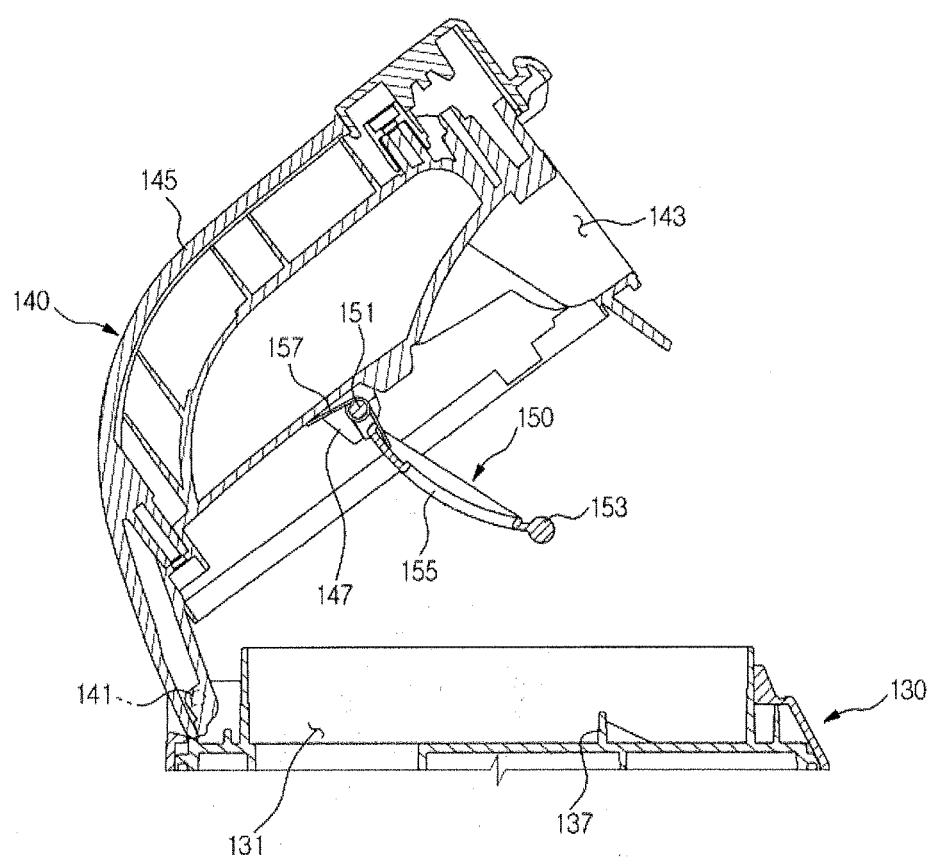
FIGS. 10 and 11 are views illustrating a process of preventing the filter cover from closing in a state in which no filter is installed.

As shown in FIG. 10, in the state in which the filter 120 is removed from the filter installation part 131 of the cover 130 in order to replace the filter 120, the catching rib 137 provided at the filter installation part 131 is exposed to the outside, because the filter 120 is not installed at the filter installation part 131.

Figure 11:
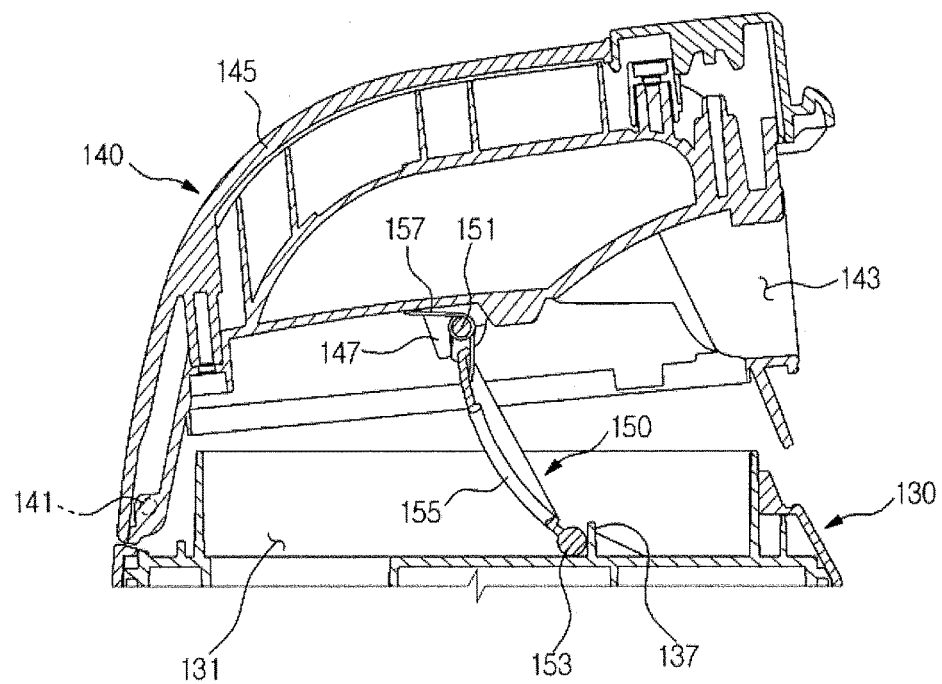

In this state, as shown in FIG. 11, if the user attempts to close the filter cover 140, the contact part 153 of the closing prevention rib 150 is caught by the catching rib 137 while the filter cover 140 is being closed, and thus the filter cover 140 is prevented from closing.

Therefore, the user may recognize the fact that the filter 120 is not installed at the filter installation part 131, open the filter cover 140, install the filter 120 at the filter installation part 131, and then operate the vacuum cleaner.

According to embodiments of the present disclosure, the user may easily recognize the fact that the filter is not installed and thus the user may not operate the vacuum cleaner without the filter, and thus any issues occurs operating the vacuum cleaner without the filter may be prevented. For example, problems in the fan motor due to the introduction of the fine dust may be prevented.

Further, since the user may recognize the fact that the filter is not installed through only the simple configuration, manufacturing costs may be saved.

Although a few embodiments of the present disclosure have been shown and described, it would be appreciated by those skilled in the art that changes may be made in these embodiments without departing from the principles and spirit of the disclosure, the scope of which is defined in the claims and their equivalents.

What is claimed is:
1. A dust collecting apparatus comprising:
 a housing comprising an inlet part through which air is sucked and a dust separating chamber which separates dust from the air sucked through the inlet part;
 a filter disposed at one portion of the housing so as to filter fine dust contained in the air passing through the dust separating chamber;
 a cover to cover the one portion of the housing and comprising a filter installation part in which the filter is removably installed and a catching rib which is provided to protrude from the filter installation part;
 a filter cover which is rotatably hinged to an upper portion of the cover to prevent the filter from being exposed; and
 a closing prevention rib which is rotatably hinged to the filter cover and rotates to close the filter cover,
 wherein when the filter is installed and the closing prevention rib contacts with the filter while closing the filter case, the closing prevention rib slides along the filter so that the filter case closes, and when the filter is not installed and the closing prevention rib contacts with the filter installation part while closing the filter case, the closing prevention rib slides along the filter installation part and is restricted by the catching rib to prevent the filter cover from closing.

2. The dust collecting apparatus according to claim 1, wherein the housing is provided to have a hollow cylindrical shape, and a base is provided at a lower portion of the housing so as to cover the lower portion of the housing.

3. The dust collecting apparatus according to claim 2, wherein an inlet port that allows the air to be sucked into the inlet part is provided at the base in communication with the inlet part.

4. The dust collecting apparatus according to claim 1, wherein the dust separating chamber has a hollow cylindrical shape and is provided in the housing in communication with the inlet part.

5. The dust collecting apparatus according to claim 4, wherein a guide part having a cylindrical shape is provided in the dust separating chamber to guide the air sucked through the inlet part and to form a rotating air current, and a spiral part having a spiral shape is provided around the guide part.

6. The dust collecting apparatus according to claim 5, wherein an outlet part is provided at the housing to discharge the air, in which the dust is removed in the dust separating chamber, to an outside of the housing, and a grill is provided at the outlet part to remove the dust again from the air in which the dust is removed in the dust separating chamber.

7. The dust collecting apparatus according to claim 6, wherein a dust collecting chamber is provided at a space between the housing and the dust separating chamber so as to collect the dust separated in the dust separating chamber, and the dust separating chamber and the dust collecting chamber are in communication with each other via an opening.

8. The dust collecting apparatus according to claim 6, wherein the cover comprises a hinge coupling part to which a filter cover is hinged, and a coupling part which is coupled to the outlet part to be in communication with the outlet part.

9. The dust collecting apparatus according to claim 8, wherein the filter cover comprises a hinge shaft which is rotatably coupled to the hinge coupling part, a rotational shaft coupling part to which the closing prevention part is hinged, and an outlet port which discharges the air in which the dust is removed by the dust separating chamber and the filter.

10. The dust collecting apparatus according to claim 9, wherein the closing prevention rib comprises a rotational shaft which is rotatably hinged to the rotational shaft coupling part, a contact part which contacts with the filter or with the filter installation part, and a connection part which connects the rotational shaft and the contact part.

11. The dust collecting apparatus according to claim 10, wherein the contact part has a cylindrical shape to be in contact with the filter or the filter installation part and then to be slid, and is also provided to be thicker than the rotational shaft so that the closing prevention rib is rotated about the rotational shaft by the force of gravity.

12. The dust collecting apparatus according to claim 10, wherein the contact part has a cylindrical shape so as to be in contact with the filter and then to be slid, and an elastic member is coupled to the rotational shaft so that the closing prevention rib is rotated when the contact part is in contact with the filter.

13. A dust collecting apparatus comprising:
 a housing comprising an inlet part through which air is sucked and a dust separating chamber which separates dust from the air sucked through the inlet part;

a filter disposed at one portion of the housing to filter fine dust contained in the air passing through the dust separating chamber;

a cover to cover the one portion of the housing and comprising a filter installation part in which the filter is installed;

a filter cover which is rotatably hinged to an upper portion of the cover so as to prevent the filter from being exposed; and a closing prevention rib which is rotatably provided at the filter cover to prevent the filter cover from closing when the filter is removed from the filter installation part, wherein a catching rib is provided at the filter installation part so that the closing prevention rib is restricted by the catching rib to prevent the filter cover from closing when the filter is removed.

14. A vacuum cleaner comprising:

a body;

a suction unit which sucks air from a surface to be cleaned using a suction force generated from the body; and a dust collecting apparatus which is provided at the body so as to receive air sucked by the suction unit and to separate dust from the received air, wherein the dust collecting apparatus comprises:

a housing comprising a dust separating chamber which receives the air sucked by the suction unit and separates the dust;

a filter disposed at one portion of the housing to filter fine dust contained in the air passing through the dust separating chamber;

a cover to cover the one portion of the housing and comprising a filter installation part which is provided at an upper portion to receive the filter and a catching rib which is provided at the filter installation part;

a filter cover which is rotatably hinged to the upper portion of the cover to prevent the filter from being exposed; and a closing prevention rib which is rotatably hinged to the filter cover and rotates to close the filter cover, wherein when the filter is installed, the closing prevention rib contacts with the filter while closing the filter case and the closing prevention rib slides along the filter so that the filter cover closes, and when the filter is not installed and the closing prevention rib contacts with the filter installation part while closing the filter case, the closing prevention rib slides along the filter installation part and is restricted by the catching rib to prevent the filter cover from closing.

15. The vacuum cleaner according to claim 14, wherein the suction unit and the dust collecting apparatus are connected with each other through a connection unit, and the dust collecting apparatus comprises an inlet port through which the air transferred through the connection unit is introduced and an outlet port through which the air introduced into the inlet port and purified by removing the dust is discharged.

16. The vacuum cleaner according to claim 15, wherein the body comprises an installation part in which the dust collecting apparatus is installed, a first communication part via which the inlet port and the connection unit are in communication with each other, and a second communication part in communication with the outlet port.

17. The vacuum cleaner according to claim 14, wherein the closing prevention rib comprises a rotational shaft which is rotatably hinged to the filter cover, a contact part which contacts with the filter or with the filter installation part, and a connection part which connects the rotational shaft and the contact part.

18. The vacuum cleaner according to claim 17, wherein the contact part has a cylindrical shape and contacts with the filter or with the filter installation part and then to be slid, and is also provided to be thicker than the rotational shaft so that the closing prevention rib is rotated about the rotational shaft by the force of gravity.

19. The vacuum cleaner according to claim 17, wherein the contact part has a cylindrical shape and contacts with the filter or with the filter installation part, and an elastic member is coupled to the rotational shaft so that the closing prevention rib is rotated when the contact part is in contact with the filter or with the filter installation part.

* * * * *